(12) United States Patent
Lesniak

(10) Patent No.: US 10,438,096 B2
(45) Date of Patent: Oct. 8, 2019

(54) IDENTIFYING AND EXCLUDING BLURRED AREAS OF IMAGES OF STAINED TISSUE TO IMPROVE CANCER SCORING

(71) Applicant: Definiens AG, Munich (DE)

(72) Inventor: Jan Martin Lesniak, Munich (DE)

(73) Assignee: Definiens AG, Munich (DE)

(*) Notice: Subject to any disclaimer, the term of this patent is extended or adjusted under 35 U.S.C. 154(b) by 189 days.

(21) Appl. No.: 15/391,088

(22) Filed: Dec. 27, 2016

(65) Prior Publication Data

US 2018/0182099 A1 Jun. 28, 2018

(51) Int. Cl.
*G06K 9/62* (2006.01)
*G06T 5/00* (2006.01)
*G06K 9/66* (2006.01)
*G06T 7/11* (2017.01)
*G06K 9/00* (2006.01)
(Continued)

(52) U.S. Cl.
CPC .......... *G06K 9/628* (2013.01); *G06K 9/0014* (2013.01); *G06K 9/036* (2013.01); *G06K 9/6202* (2013.01); *G06K 9/6256* (2013.01); *G06K 9/6277* (2013.01); *G06K 9/66* (2013.01); *G06T 5/002* (2013.01); *G06T 7/0012* (2013.01); *G06T 7/11* (2017.01); *G06T 7/136* (2017.01); *G06T 2207/10024* (2013.01); *G06T 2207/20021* (2013.01); *G06T 2207/20081* (2013.01);
(Continued)

(58) Field of Classification Search
None
See application file for complete search history.

(56) References Cited

U.S. PATENT DOCUMENTS 4,620,154 A   10/1986   Inouye ........................ 324/309
6,453,079 B1   9/2002   McInerny ................... 382/311
(Continued)

FOREIGN PATENT DOCUMENTS

EP   3023910 A1   7/2015

OTHER PUBLICATIONS

N. Hashimoto et al., "Referenceless image quality evaluation for whole slide imaging," Journal of Pathology Informatics, vol. 3, No. 1, Jan. 1, 2012, p. 9, XP055474730 ISSN: 2153-3539.93891 (9 pages).
(Continued)

*Primary Examiner* — Nancy Bitar
(74) *Attorney, Agent, or Firm* — Imperium Patent Works; Darien K. Wallace

(57) ABSTRACT

A method for identifying blurred areas in digital images of stained tissue involves artificially blurring a learning tile and then training a pixel classifier to correctly classify each pixel as belonging either to the learning tile or to a blurred copy. A learning tile is first selected from a digital image of stained tissue. The learning tile is copied and blurred by applying a filter to each pixel. The pixel classifier is trained to correctly classify each pixel as belonging either to the learning tile or to the blurred, copied learning tile. The pixel classifier then classifies each pixel of the entire digital image as most likely resembling either the learning tile or the blurred learning tile. The digital image is segmented into blurred and unblurred areas based on the pixel classification. The blurred areas and the unblurred areas of the digital image are identified on a graphical user interface.

15 Claims, 14 Drawing Sheets

(51) Int. Cl.
*G06K 9/03* (2006.01)
*G06T 7/00* (2017.01)
*G06T 7/136* (2017.01)

(52) U.S. Cl.
CPC ............... *G06T 2207/30024* (2013.01); *G06T 2207/30068* (2013.01); *G06T 2207/30096* (2013.01)

(56) References Cited

U.S. PATENT DOCUMENTS

| | | | |
|---|---|---|---|
| 7,995,864 B2 | 8/2011 | Mullick et al. | 382/294 |
| 8,139,831 B2 | 3/2012 | Khamene et al. | 382/128 |
| 8,165,425 B2 | 4/2012 | DeClerck | 382/294 |
| 8,200,316 B2 | 6/2012 | Keppel et al. | 600/436 |
| 8,311,344 B2 | 11/2012 | Dunlop et al. | 382/224 |
| 8,319,793 B2 | 11/2012 | Schaepe et al. | 345/619 |
| 8,351,676 B2 | 1/2013 | Dai et al. | 382/133 |
| 8,620,086 B2 | 12/2013 | Lam et al. | 382/190 |
| 8,699,769 B2* | 4/2014 | Schoenmeyer | G06T 7/0012 382/128 |
| 9,519,868 B2 | 12/2016 | Criminisi | G06N 99/005 |
| 9,672,447 B2* | 6/2017 | Hedlund | G06T 11/001 |
| 9,805,248 B2* | 10/2017 | Brieu | G06K 9/4642 |
| 10,121,268 B2* | 11/2018 | Baumecker | G06F 9/30 |
| 2003/0208116 A1 | 11/2003 | Liang et al. | 600/407 |
| 2005/0190955 A1 | 9/2005 | Brown | 382/128 |
| 2008/0008349 A1 | 1/2008 | Binnig et al. | 382/100 |
| 2008/0144013 A1 | 6/2008 | Lanoue et al. | 356/73 |
| 2010/0172556 A1 | 7/2010 | Cohen et al. | 382/128 |
| 2010/0183213 A1 | 7/2010 | Keppel et al. | 382/131 |
| 2010/0215227 A1 | 8/2010 | Grunkin et al. | 382/128 |
| 2010/0265267 A1 | 10/2010 | Schaepe et al. | 345/619 |
| 2012/0226709 A1 | 9/2012 | Bhargava et al. | 707/769 |
| 2013/0016886 A1* | 1/2013 | Schoenmeyer | G06T 7/0012 382/128 |
| 2013/0034202 A1 | 2/2013 | Keppel et al. | 378/37 |
| 2013/0170726 A1 | 7/2013 | Kaufman et al. | 382/131 |
| 2014/0073907 A1 | 3/2014 | Kumar et al. | 600/414 |
| 2014/0228707 A1 | 8/2014 | Brieu et al. | 600/567 |
| 2014/0378500 A1 | 12/2014 | Cohen et al. | 514/291 |
| 2016/0042511 A1* | 2/2016 | Chukka | G06T 7/0012 382/133 |
| 2016/0063308 A1* | 3/2016 | Pauly | G06K 9/0014 382/128 |
| 2016/0098589 A1* | 4/2016 | Brieu | G06K 9/4642 382/128 |
| 2017/0337415 A1* | 11/2017 | Pauly | G06K 9/0014 |

OTHER PUBLICATIONS

X. Moles Lopez et al., "An Automated Blur Detection Method for Histological Whole Slide Imaging," PLoS ONE, vol. 8, No. 12, Dec. 13, 2013, p. e82710 XP055474690 (12 pages).

European Search Report dated May 24, 2018 by the European Patent Office in the European patent application EP17207980.8 that claims priority to this application (9 pages).

Bueno et al., "Colour Model Analysis 9 for Histopathology Image Processing," Color Medical Image Analysis, Springer Jan. 1, 2013 XP055264084 pp. 165-180 (16 pages).

DiFranco et al., "Ensemble based system for whole-slide prostate cancer probability mapping using color texture features," Oct.-Dec. 2011, Computerized Medical Imaging and Graphics, vol. 35, Issues 7-8, pp. 629-645 retrieved Sep. 9, 2016 from: www.sciencedirect.com/science/article/pii/S0895611110001369 (17 pages).

Havaei et al., "Efficient Interactive Brain Tumor Segmentation as Within-Brain kNN Classification," Int'l Conf. on Pattern Recognition, IEEE Computer Society, Aug. 24, 2014 XP032698227 ISSN: 1051-4651 pp. 556-561 (6 pages).

Schroff et al., "Object Class Segmentation Using Random Forests," Proceedings of the British Machine Vision Conference, Jan. 1, 2008 XP055264531 ISBN: 978-1-901725-36-0 (10 pages).

Thomas et al., "Visualization of High Resolution Spatial Mass Spectrometric Data during Acquisition," Aug. 28-Sep. 1, 2012, 2012 Annual Int'l Conference of the IEEE Engineering in Medicine and Biology Society, pp. 5545-5548, retrieved Sep. 9, 2016 from Internet: http://ieeexplore.ieee.org/document/6347250/ (4 pages).

* cited by examiner

43 TILES SELECTED FOR IMAGE PROCESSING

TILE #4 SHOWING
STAINED BREAST
TISSUE
67

HEAT MAP OF
CLASSIFIED PIXELS
64

SEGMENTED TILE
IDENTIFYING
BLURRED AREAS
68

OBJECTS OF
BLURRED
AREAS
69

IDENTIFYING AND EXCLUDING BLURRED AREAS OF IMAGES OF STAINED TISSUE TO IMPROVE CANCER SCORING

TECHNICAL FIELD

The present invention relates generally to image analysis of stained tissue, and more specifically to identifying blurred areas in digital images of tissue slices.

BACKGROUND

Cancer is typically diagnosed by analyzing stained samples of tissue from cancer patients and then correlating target patterns in the tissue samples with grading and scoring methods for different kinds of cancers. For example, the Gleason grading system indicates the malignancy of prostate cancer based on the architectural pattern of the glands of a stained prostate tumor. The Fuhrman nuclear grading system indicates the severity of renal cell carcinoma (RCC) based on the morphology of the nuclei of kidney cells. Breast cancer can be diagnosed by grading stained breast tissue using the Allred score, the the Elston-Ellis score, the HercepTest® score or the Ki-67 test score. The Allred score indicates the severity of cancer based on the percentage of cells that have been stained to a certain intensity by the estrogen receptor (ER) antibody. The Elston-Ellis score indicates the severity of cancer based on the proportion of tubules in the tissue sample, the similarity of nucleus sizes and the number of dividing cells per high power field of 40× magnification. The HercepTest score indicates the severity of cancer based on the level of HER2 protein overexpression as indicated by the degree of membrane staining. The Ki-67 test measures the proliferation rate, which is the percentage of cancer cells in the breast tissue that are actively dividing. The Ki-67 labeling index is a measure of the percentage of cancer cells whose nuclei contain the Ki-67 protein that has been immunohisto-chemically stained. A level of greater than twenty percent indicates a high-risk, aggressive tumor.

The accuracy of these scoring and grading systems depends, however, on the accuracy of the image analysis of the stained tissue. Human error is one cause of inconsistent scoring that results when a human operator, such as a pathologist, misjudges the target patterns and structures in the stained tissue due to fatigue or loss of concentration. Computer-assisted image analysis systems have been developed to support pathologists in the tedious task of grading and scoring digital images of stained tissue samples. But even the accuracy of computer-assisted scoring methods is limited by the quality of the digital images of the stained tissue. One cause of inaccuracy in scoring occurs when image analysis is performed on blurred areas of digital images of tissue slices. Conventionally, the pathologist manually marks the blurred areas of the image of each tissue slice that are to be avoided when performing the object and pattern recognition that is the basis for the diagnostic cancer scoring. However, the pathologist can only mark large blurred areas, such as a scanning stripe along the entire slide that is out of focus, as opposed to the thousands of smaller blurred areas in a high resolution image that can result from the differing light refraction caused by microdroplets on the tissue.

A method is sought to identify and mark the many small blurred areas in digital images of tissue slices so as to improve the accuracy of cancer scoring by using image analysis results from only unblurred areas.

SUMMARY

A method for identifying blurred areas in digital images of stained tissue involves artificially blurring a learning tile and then training a pixel classifier to correctly classify each pixel as belonging either to the learning tile or to the blurred learning tile. A learning tile is selected from the digital image of a slice of tissue of a cancer patient that has been stained using a biomarker. A portion of the pixels exhibits the color stained using the biomarker. The learning tile is duplicated to create a copied learning region. The copied learning region is distorted by applying a filter to the pixel values of each pixel of the copied learning region so as artificially to blur the copied learning region. A pixel classifier is trained by analyzing the pixel values of each pixel of the learning region and the pixel values of a corresponding pixel in the copied learning region. The pixel classifier is trained to correctly classify each pixel as belonging either to the learning tile or to the copied learning tile. Each pixel of the digital image is classified as most likely resembling either the learning tile or the copied learning tile using the pixel classifier. The digital image is then segmented into blurred areas and unblurred areas based on the classifying of each pixel as belonging either to the learning tile or to the copied learning tile. The blurred areas and the unblurred areas of the digital image are identified on a graphical user interface In another embodiment, the method for identifying blurred areas in digital images of stained tissue involves training a pixel classifier comprised of pixelwise descriptors on both unblurred and artificially blurred regions. A digital image of a slice of tissue from a cancer patient that has been stained using a biomarker is divided into tiles. For each pixel of the image, the color stained using the biomarker, which is defined by pixel values, has a magnitude derived from the pixel values. A learning region is selected as the tile whose pixel values represent the mean magnitude of the color stained using the biomarker. The learning region includes first and second subregions. The second subregion is distorted by applying a filter to the pixel values of each pixel of the second subregion so as artificially to blur the second subregion. The first subregion remains unblurred.

A pixelwise descriptor of the pixel classifier is generated by analyzing and comparing the pixel values of each pixel of the learning region with the pixel values of neighboring pixels at predetermined offsets from each analyzed pixel. The pixelwise descriptor is trained to indicate, based on the comparing with neighboring pixels, that each pixel of the learning region most likely belongs either to an unblurred class of pixels such as those in the first subregion or to a blurred class of pixels such as those in the second subregion.

Each pixel of the digital image is characterized as most likely belonging either to the unblurred class of pixels or to the blurred class of pixels using the pixelwise descriptor by classifying each characterized pixel based on the pixel values of neighboring pixels at predetermined offsets from each characterized pixel. The blurred areas of the digital image are identified based on the classifying of pixels as belonging to the blurred class of pixels. Image objects are generated by segmenting the digital image except in the identified blurred areas. Using the image objects, a score is determined that indicates a level of cancer malignancy of the slice of tissue from the cancer patient.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
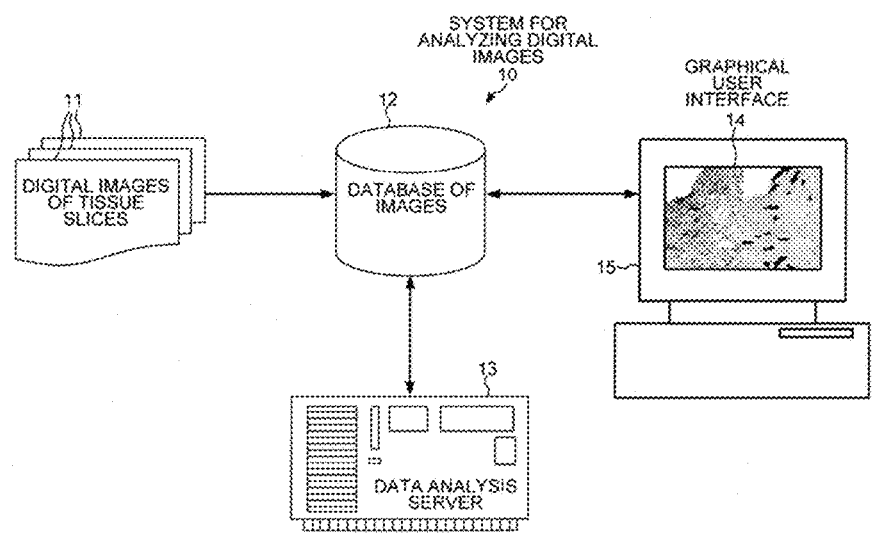
FIG. 1 is a diagram of a system for analyzing digital images that uses pixel-oriented analysis to identify blurred areas in digital images of tissue slices.

FIG. 1 shows a system 10 for analyzing digital images that uses pixel-oriented analysis to identify blurred areas in digital images of tissue slices stained using biomarkers so that object-oriented analysis can be performed only on the unblurred areas in order to obtain a more accurate prognostic cancer score. System 10 is used to analyze images of tissue slices stained using various biomarkers, such as tissue stained with hematoxylin or with a dye attached to a protein-specific antibody using immunohistochemistry (IHC), such as a Ki-67 antibody stain.

Digital images 11 of the stained tissue slices are acquired at high magnification. A typical digital image of a tissue slice has a resolution of 100,000×200,000 pixels, or 20 billion pixels. The acquired digital images 11 are stored in a database 12 of digital images. Image analysis software executing on a data analysis server 13 then performs intelligent image processing and automated classification and quantification. The image analysis software is a computer program product tangibly embodied on a computer-readable storage medium in server 13 and comprises computer readable and executable program instructions that when executed by a processor on server 13 provide a visual display on a graphical user interface 14 of an interconnected display device 15, such as a personal computer.

System 10 analyzes, grades, scores and displays the digital images 11 of tissue slices that have been stained with various biomarkers. The image analysis program first identifies blurred areas in digital images 11 and then segments and classifies objects in the unblurred areas. The blurred areas are identified using statistical pixel-oriented analysis, whereas the grading is performed using object-oriented analysis. When performing object-oriented analysis, the image analysis software links pixels to objects such that the unlinked input data in the form of pixels is transformed into a hierarchical semantic network of image objects. The image analysis program prepares links between some objects and thereby generates higher hierarchically ranked objects. The image analysis program assigns the higher hierarchically ranked objects with properties, classifies them, and then links those objects again at a still higher level to other objects. The higher hierarchically ranked objects are used to find target patterns in the images, which are used to obtain a prognostic cancer score. More easily detected starting image objects are first found and then used to identify harder-to-find image objects in the hierarchical data structure.

Figure 2:
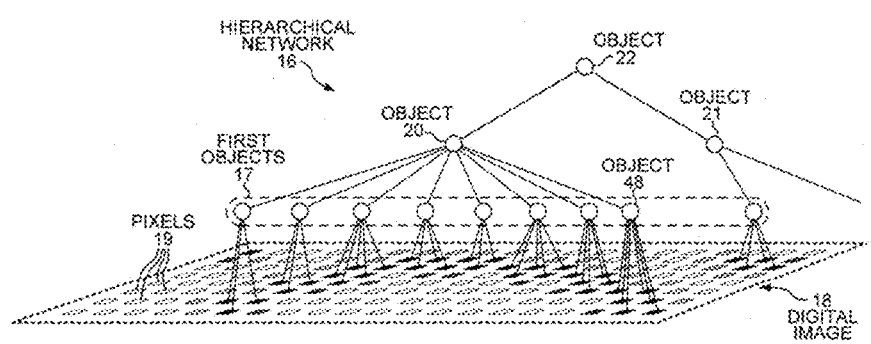
FIG. 2 illustrates a data network generated by the system of FIG. 1 in which data objects of a hierarchical network are linked to selected pixels of an image of a stained tissue.

FIG. 2 illustrates an exemplary hierarchical network 16 that is generated by image analysis system 10. System 10 generates first objects 17 from a digital image 18 based on the stained tissue. The image analysis program of system 10 uses object-oriented image analysis to generate data objects of hierarchical semantic network 16 by linking selected pixels 19 to image objects according to a classification network and according to a process hierarchy of steps and algorithms. For a more detailed description of generating a data network using a process hierarchy and a class network, see U.S. Pat. No. 8,319,793, the contents of which are incorporated herein by reference.

Each digital image comprises pixel values associated with the locations of each of the pixels 19. The image analysis program operates on the digital pixel values and links the pixels to form image objects. Each object is linked to a set of pixel locations based on the associated pixel values. For example, an object is generated by linking to the object those pixels having similar characteristics, such as hue, saturation and brightness as defined by the pixel values. Alternatively, the pixel values can be expressed in a 3-value color space.

For example, in the RGB color space, three 3-digit numbers in the range from zero to 255 define the color. The three numbers represent the amounts of red, green and blue in the represented color. For example, red is represented as 255-0-0, dark green is represented as 0-100-0, royal blue is designated as 65-105-225, white is represented as 255-255-255, and black is represented as 0-0-0. Smaller numbers represent darker colors, so 100-100-100 is a darker gray than 200-200-200, and 0-0-128 is a darker blue (navy) than straight blue 0-0-255. Although the operation of system 10 is described herein in relation to the RGB color space, other color spaces and representations may also be used, such as the CMYK (cyan, magenta, yellow, black) color model, the CIE 1931 color space, the 1964 xyz color space or the HSV and HSL representation of the RGB color space. Thresholds of brightness at pixel locations that are grouped together can be obtained from a histogram of the pixel values in the digital image. The pixels form the lowest hierarchical level of hierarchical network 16.

In one example, pixels having the color and intensity imparted by the stain of a biomarker are identified and linked to first objects 17. The first objects 17 form the second hierarchical level of hierarchical network 16. Then data objects are linked together into classes according to membership functions of the classes defined in the class network. For example, objects representing nuclei are linked together to form objects 20-21 in a third hierarchical level of hierarchical network 16. In FIG. 2, some of the first objects 17 correspond to stained pixels of a nucleus corresponding to object 20. In addition, another of the first objects 17 corresponds to stained pixels of a separate nucleus represented by object 21. An additional object 22 is generated in a fourth hierarchical level of hierarchical network 16 and is linked to all of the objects that represent stained nuclei. Thus, the objects 20-21 corresponding to stained nuclei are linked to object 22.

The knowledge and the program flow of the image analysis program are separated in the software structure. The parameters by which the image analysis is performed, for example thresholds of size or brightness, can be changed without having to revise the process hierarchy of software steps. The image analysis software displays both the original digital images 11 as well as the corresponding processed images and heat maps on the graphical user interface 14. Pixels corresponding to classified and segmented objects in the digital images are colored, marked or highlighted to correspond to their object classification. For example, the pixels of objects that are members of the same object class are depicted in the same color. In addition, heat maps are displayed in which pixels of the same pixel class have the same color.

Figure 3:
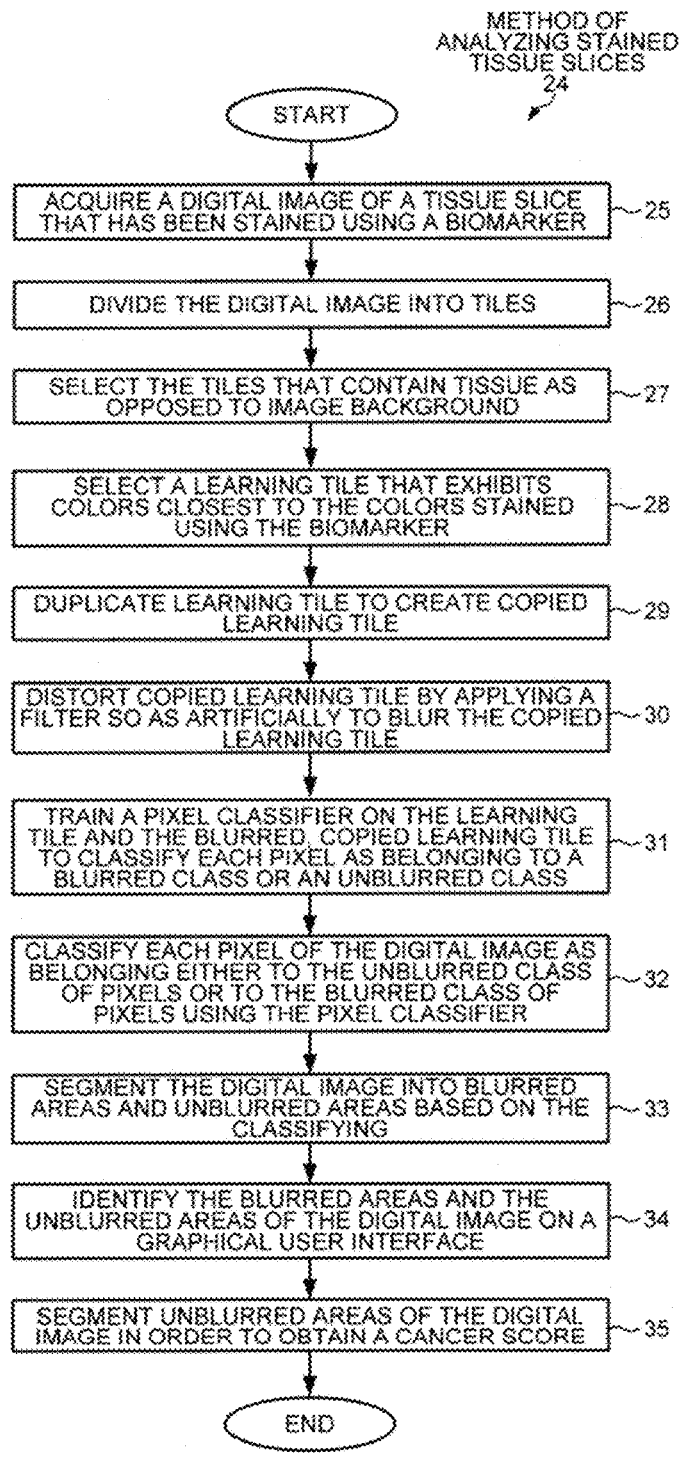
FIG. 3 is a flowchart of steps by which the system of FIG. 1 identifies blurred areas of digital images of stained tissue slices before recognizing patterns in the images using object-oriented analysis.

FIG. 3 is a flowchart of steps 25-35 of a method 24 by which analysis system 10 identifies blurred areas of digital images of stained tissue slices before recognizing patterns in the images using object-oriented analysis. In a first step 25, a high-resolution digital image is acquired of a tissue slice that has been stained using one or more biomarkers.

Figure 4:
FIG. 4 shows a high-resolution digital image of breast tissue upon which immunohistochemical (IHC) Ki-67 staining has been performed.

FIG. 4 shows an exemplary digital image 36 of breast tissue upon which immunohistochemical (IHC) Ki-67 staining has been performed. In the embodiment of FIG. 4, both hematoxylin and the dye diaminobenzidine (DAB) are used in the staining. The positive cell nuclei containing the Ki-67 protein are stained by DAB and appear as brown, whereas the negative cell nuclei that are not stained by DAB have the blue color of the counter stain hematoxylin. A slice of the stained breast tissue was placed on a slide before the digital image 36 was scanned.

Figure 5:
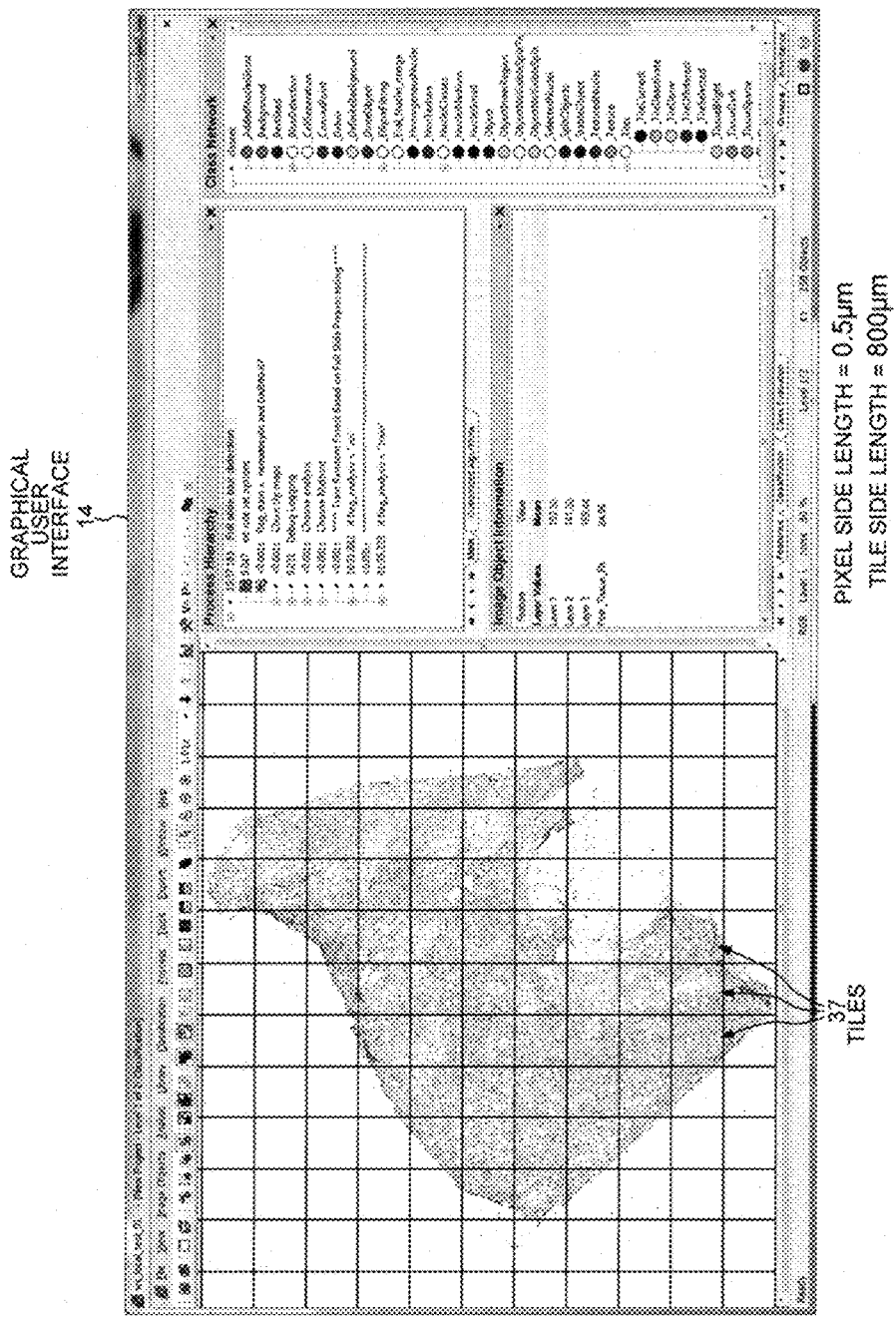
FIG. 5 is a screenshot of the graphical user interface of the system of FIG. 1 in which the image of FIG. 4 is displayed in tiled sections.

In step 26, high-resolution digital image 36 is divided into tiles 37. By splitting image 36 into smaller areas, less processing memory is required for the computations performed on the pixel data of each tile. FIG. 5 shows how digital image 36 is displayed in tiled sections 37 on graphical user interface 14 of system 10 after step 26 is performed. The length of the sides of each square tile in this example is eight hundred microns (800 μm), and the side length of each pixel at the resolution of image 36 is 0.5 μm. Thus, each tile is 1600×1600 pixels.

Figure 6:
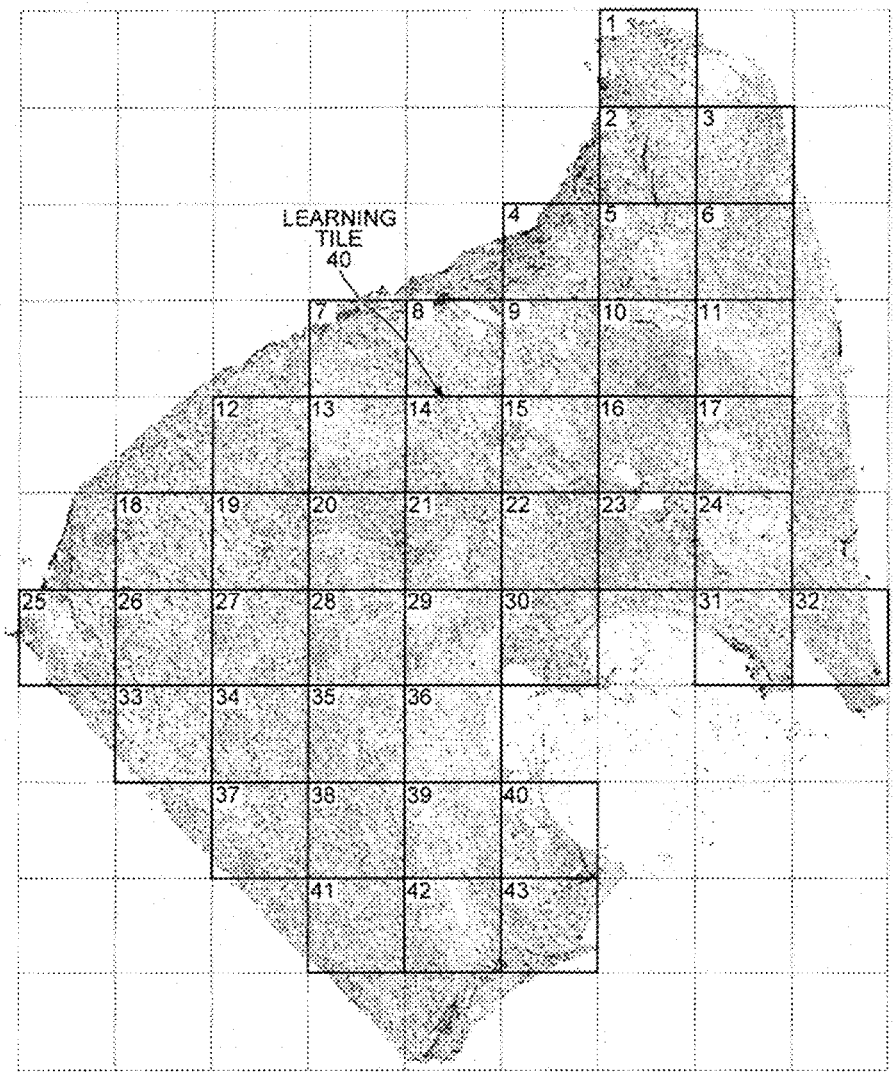
FIG. 6 shows 43 tiles of the digital image that have been selected to be used to identify a learning tile that exhibits the most representative IHC Ki-67 staining.

In step 27, system 10 selects the tiles that contain mostly tissue from which a learning tile is later chosen. Tiles that contain mostly image background and non-tissue artifacts are not used in the selection of the learning tile. FIG. 6 shows the forty-three tiles on digital image 36 that have been selected by system 10 to be used to identify the learning tile that exhibits the most representative staining by hematoxylin and DAB. The tiles are numbered 1-43 for identification.

In step 28, system 10 selects a learning region of digital image 36 on which to train a pixel-based machine learning model to recognize blurred areas. In this embodiment, the learning region is a tile. The learning tile is chosen from among the forty-three selected tiles as the region of the image 36 that exhibits colors closest to both the median brown of the DAB stain and the median blue of the hematoxylin stain. In this embodiment, the color of each pixel is defined by three 3-digit numbers in the range from zero to 255 that represent the amounts of red, green and blue in the pixel color. The amount of hematoxylin blue in each pixel i is defined by the transformation $$H_i = (2B_i/R_i)/(R_i+G_i+B_i)^{1/2},$$

and the amount of DAB brown in each pixel i is defined by the transformation $$K_i = (R_i^{1/2}/B_i)/(R_i+G_i+B_i)^{1/2},$$

where $R_i$, $G_i$ and $B_i$ are the 3-digit values of the red, green and blue values of each pixel i. The values of $H_i$ and $K_i$ range from zero to 255 and will have a lighter color and a higher value in the presence of more hematoxylin stain and DAB stain of the Ki-67 protein, respectively. For purposes of calculating the hematoxylin blue $H_i$ in each pixel i and the DAB brown $K_i$ in each pixel i, lower resolution tiles can be used to speed the calculation. In one implementation, the tiles are downsampled to achieve pixels whose sides have a length of 8 μm.

Figure 8:
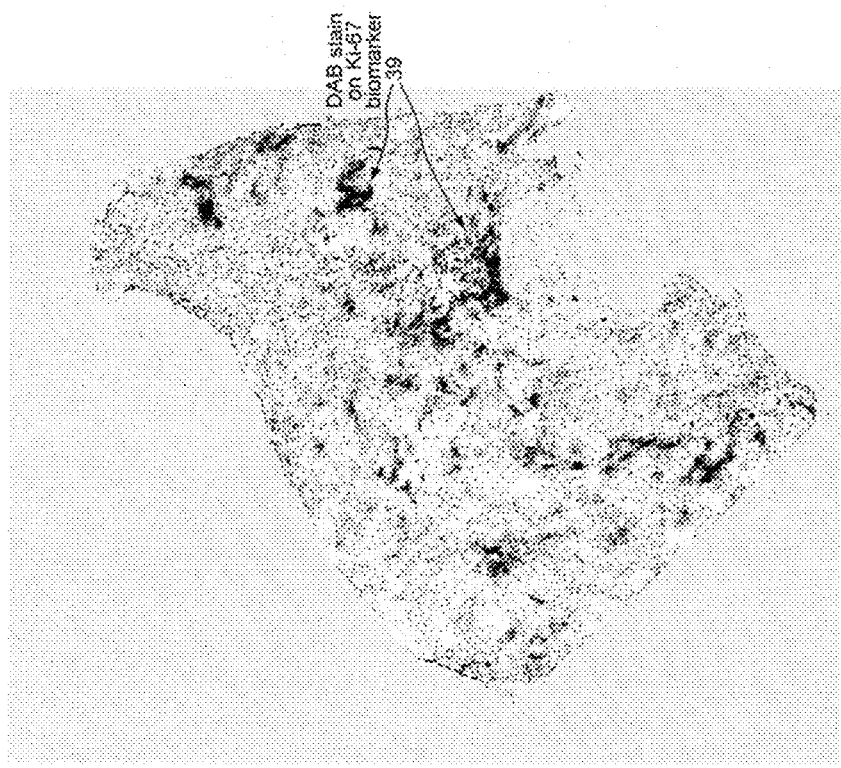
FIG. 8 illustrates the staining of the digital image by DAB using the biomarker Ki-67 through the color transformation K.
Figure 7:
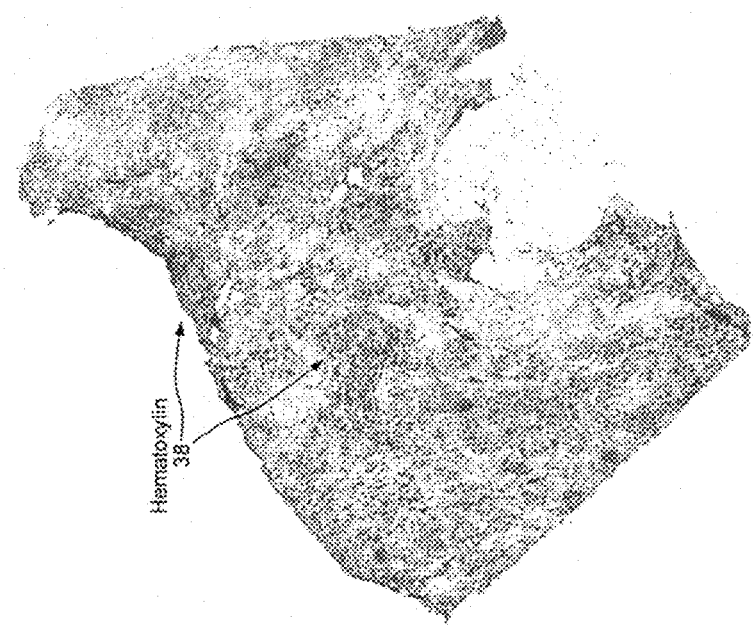
FIG. 7 illustrates the staining of the digital image by hematoxylin through the color transformation H.

FIG. 7 illustrates the staining by hematoxylin 38 in image 36 through the transformation $H_i$. For ease of illustration, the inverse brightness (255-$H_i$) is shown in FIG. 7 so that darker shades of gray represent more staining by the hematoxylin 38. FIG. 8 shows the staining by DAB 39 in image 36 through the transformation $K_i$. For ease of illustration, the inverse brightness (255-$K_i$) is shown in FIG. 8 so that darker shades of gray represent more staining by DAB and presence of the Ki-67 protein.

In order to identify the tile that closest matches the median DAB brown and the median hematoxylin blue of all of the tiles, the mean values of $H_i$ and $K_i$ of all the pixels in each tile are calculated. Then the median value $H_{MED}$ from among the mean of the $H_i$ values of all of the tiles is chosen, and the median value $K_{MED}$ from among the mean of the $K_i$ values of all of the tiles is chosen. The two median values $H_{MED}$ and $K_{MED}$ are the medians of the mean values of the pixel colors of each tile. In this example, the median $H_{MED}$ of the mean values $H_i$ for the forty-three tiles is 41.52, and the median $K_{MED}$ of the mean values $K_i$ for the forty-three tiles is 16.03. The median value $K_{MED}$ is closer to zero than to 255 because even if all cells were cancerous, only the nuclei would be stained, and the pixels representing the nuclei make up a small proportion of the pixels of each tile. The learning tile is chosen as the tile whose means (averages) of the $H_i$ and $K_i$ values have the smallest Euclidian distance to the median values $H_{MED}$ and $K_{MED}$ for the forty-three tiles. For each tile j, the Euclidian distance is calculated as $$D_j = ((H_j - H_{MED})^2 + (K_j - K_{MED})^2)^{1/2},$$

where $H_j$ and $K_j$ are the averages of the hematoxylin blue values and the DAB brown values for each tile j.

Figure 9:
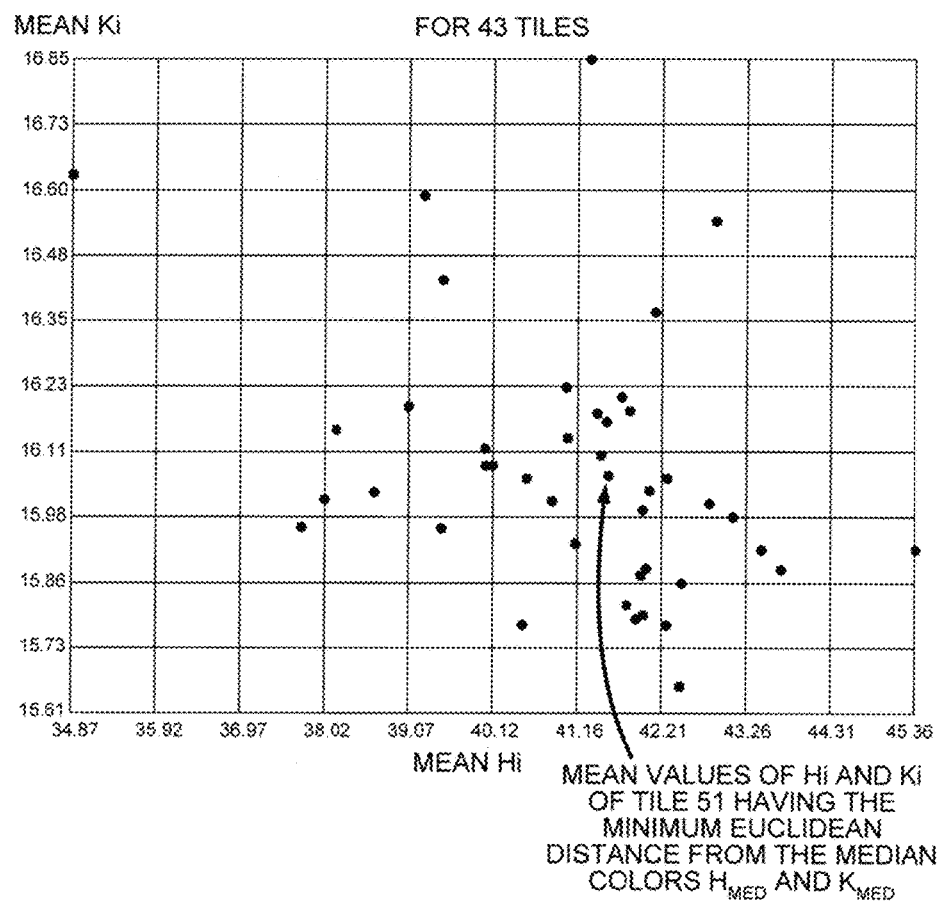
FIG. 9 is a scatter plot of points representing the mean color transformation values H and K for each of the 43 selected tiles shown in FIG. 6.

FIG. 9 is a scatter plot of points representing the mean $H_i$ and $K_i$ values of each of the forty-three selected tiles shown in FIG. 6, where the mean hematoxylin blue value is the abscissa plotted on the horizontal axis and the mean DAB brown value is the ordinate plotted on the vertical axis. Thus, the scatter plot has forty-three points corresponding to the forty-three tiles. In this example, tile #14 has the mean $H_i$ and $K_i$ values with the smallest Euclidian distance to the median values $H_{MED}$ and $K_{MED}$ for all of the tiles. For tile #14, the mean $H_i$ value is 41.46, and the mean $K_i$ value is 16.05. Tile #14 has the smallest Euclidian distance of 0.06325, which is calculated as:

$$0.06325 = ((41.46 - 41.52)^2 + (16.05 - 16.03)^2)^{1/2}$$

Thus, the result of step 28 is to select tile #14 as the learning tile 40 that will be used to train a pixel-based machine learning model to recognize blurred areas of image 16.

In step 29, the learning region 40 of tile #14 is duplicated to create a copied learning region 41. Step 29 is performed on a full resolution version of tile 40 in which the length of each side of each pixel is 0.5 µm. Both the learning tile 40 and the copied learning tile 41 are squares of 1600×1600 pixels. System 10 then operates on both the learning tile 40 and the copied learning tile 41.

In step 30, the copied learning region 41 is distorted by applying a filter to the pixel values of each pixel of the copied learning region so as artificially to blur the copied learning region. In one implementation, the filter applied to each pixel of the copied learning region 41 is a Gaussian filter that modifies the value of each pixel based on the values of neighboring pixels. The blurred image of the copied learning tile most closely resembled an image of stained tissue blurred by natural causes when the filter was applied at a radius of twenty pixels corresponding to ten microns (10 µm). The 20-pixel radius is applied by modifying the pixel values of a center pixel in a 41×41 pixel box based on the pixel values of the other pixels in the box. Each of the R, G and B pixel values is modified separately based on the R, G and B pixel values of the neighboring pixels.

Figure 10:
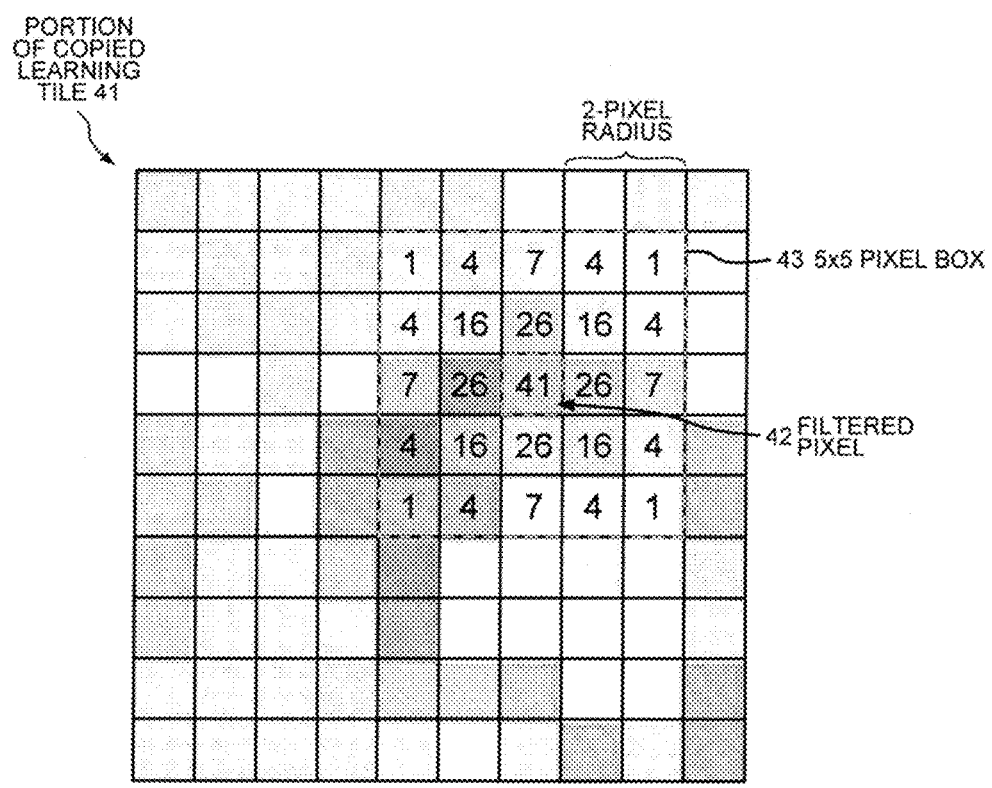
FIG. 10 is a diagram illustrating the step of applying a filter in order to artificially blur the copied learning tile.

FIG. 10 illustrates the step of applying a filter in order to artificially blur the copied learning region 41. Although the best results were achieved by filtering with a 20-pixel radius, the filtering step 30 is now described in more detail using a smaller 2-pixel radius. FIG. 10 shows a 100-pixel portion of copied learning tile 41. The pixel 42 is being filtered by applying a Gaussian filter to a 5×5 pixel box 43 centered on pixel 42. Each of the R, G and B pixel values of pixel 42 is filtered separately. In one example, filtered pixel 42 has a brown color represented by the R, G and B values 200, 125 and 75, respectively. The modification of just the red pixel value 200 is described here. The red pixel value of each of the twenty-five pixels in box 43 is multiplied by the factor listed for that pixel in FIG. 10. For example, the red pixel value 200 of filtered pixel 42 is multiplied by the factor 41. Then the twenty-five products of the factors times the red pixel values are summed. Finally, the sum is divided by the total of all of the factors, which equals 273. Thus, the red pixel value 200 makes only a 15% contribution (41/273) to the magnitude of the filtered red pixel value. The filtered red pixel value is influenced by the red pixel values of the neighboring pixels, with more weighting allocated to closer pixels, as the weighting factors in FIG. 10 demonstrate. The effect of the filtering is to modify the red pixel value of filtered pixel 42 to more closely resemble the red pixel values of the neighboring pixels and to reduce the color contrast. The green and blue pixel values of filtered pixel 42 are modified in the same way as the red pixel value. Locally filtering the red, green and blue pixel values reduces the color contrast and artificially blurs the copied learning region 41.

In an embodiment in which the pixels of digital image 36 indicate color as a gray scale, there would be only a single gray-scale channel. The filtering step 30 would then modify just the gray-scale pixel value for each pixel of the copied learning region 41.

Figure 11:
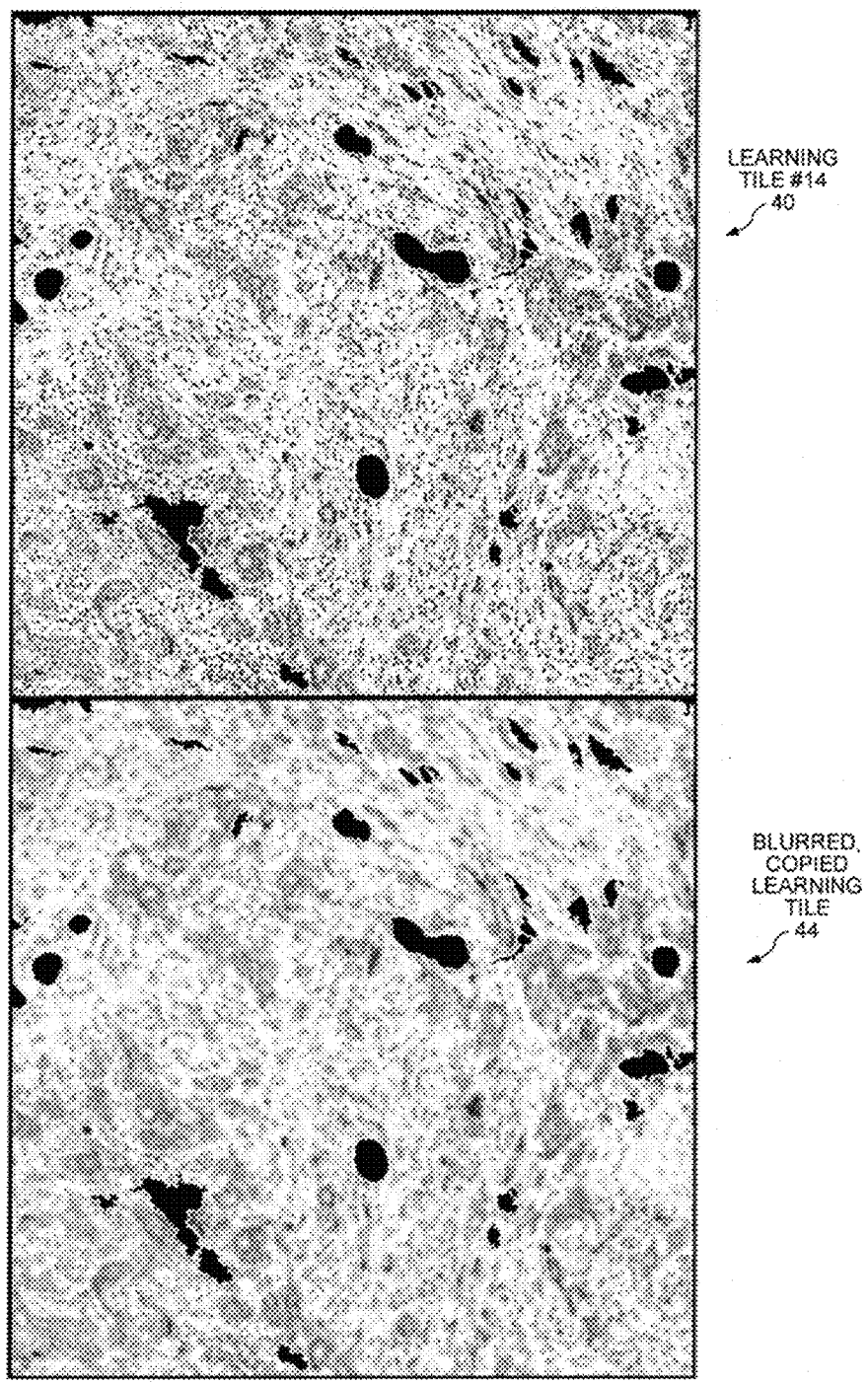
FIG. 11 shows a more detailed view of the selected learning tile as well as the blurred, copied learning tile.

FIG. 11 shows a more detailed view of learning tile 40 of FIG. 6. In addition, FIG. 11 shows a blurred learning tile 44 generated by artificially blurring the copied learning tile 41 by applying a filter to the pixel values of copied learning tile 41.

In step 31, a pixel classifier is trained on learning tile 40 and on blurred, copied learning tile 44 to classify each pixel as belonging either to the learning region or to the copied learning region. The pixel classifier is a binary classifier that is trained using supervised learning because system 10 knows that each pixel of learning tile 40 belongs to an unblurred class of pixels and that each pixel of the blurred, copied learning tile 44 belongs to a blurred class of pixels. Various kinds of pixel classifiers can be used, such as a random forest classifier, a convolutional neuronal network, a decision tree classifier, a support vector machine classifier or a Bayes classifier.

In this embodiment, the pixel classifier is a set of random forest pixelwise descriptors. Each pixelwise descriptor is generated by comparing learning pixels of the learning region 40 and the blurred learning region 44 to neighboring pixels at predetermined offsets from each of the learning pixels. Based on the comparing of learning pixels to their neighboring pixels, each pixelwise descriptor is trained to indicate that each of the learning pixels most likely belongs either to the unblurred class of pixels such as those in learning tile 40 or to the blurred class of pixels such as those in the blurred learning tile 44. The pixelwise descriptors indicate the most likely class associated with each pixel without referencing any image objects that would be generated using object-based image analysis. Purely pixel-based image analysis is performed using the descriptors. The pixelwise descriptors indicate the probability that a characterized pixel belongs to a class based on a characteristic of a second pixel or group of pixels at a predetermined offset from the characterized pixel. The pixelwise descriptors are used in random forest decision trees to indicate the probability that each pixel belongs to a particular class.

The class probability of each pixel is calculated using multiple decision trees of pixelwise descriptors. Then the average of the probabilities is taken as the result. The various decision trees are trained with random different neighboring pixels from the learning tiles 40, 44 so that the average probability of belonging to a particular class in the execution mode is obtained from a random forest of decision trees in which overfitting to particular training pixels is avoided. Each decision tree is trained on a different random set of neighboring pixels. The average result from multiple random forest decision trees provides a more accurate classification result on the pixels outside of learning tile 40 and blurred learning tile 44. In one implementation, an average probability of a pixel belonging to the blurred or unblurred class is calculated using twenty random forest decision trees.

Figure 12:
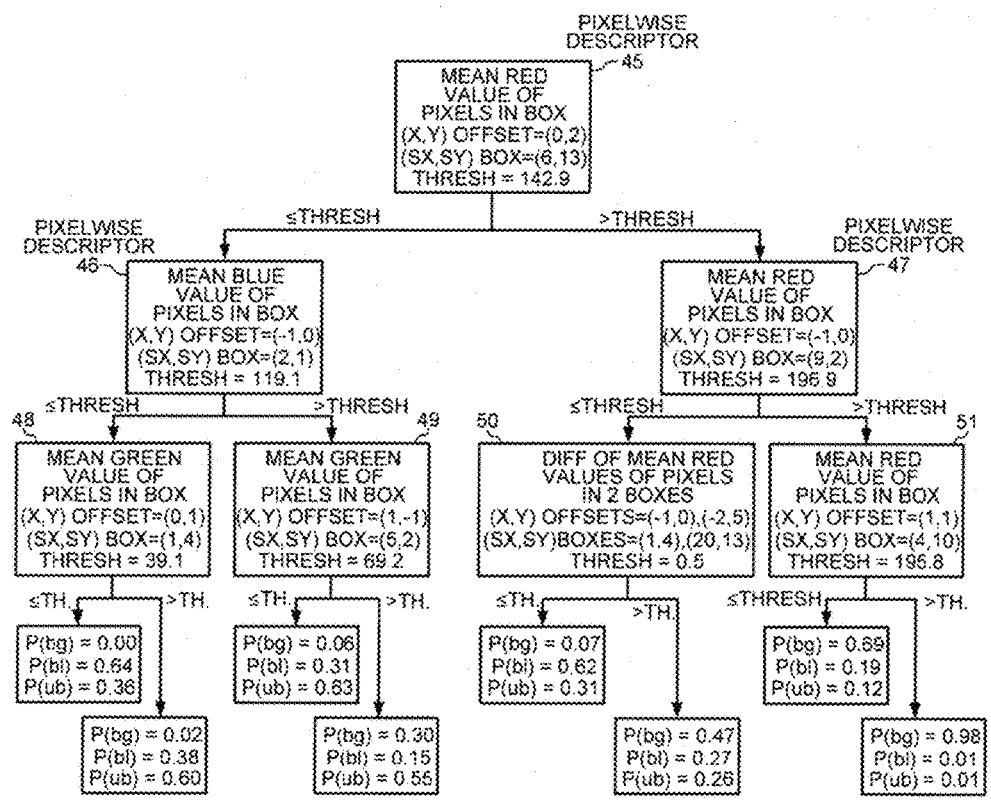
FIG. 12 is a schematic diagram of a decision tree with pixelwise descriptors used to determine the probability that a characterized pixel belongs to a blurred pixel class or an unblurred pixel class.

FIG. 12 is a schematic diagram illustrating how exemplary pixelwise descriptors 45-51 are applied in one of the random forest decision trees to determine the probability that a pixel belongs to one of three classes: blurred (bl), unblurred (ub) and background (bg). In other examples, the pixelwise descriptors classify each pixel into just two classes: blurred (bl) and unblurred (ub). System 10 trains on random pixels from the learning tiles 40, 44 in order to match the correct class by choosing the appropriate pixelwise descriptors and coefficients of those descriptors. System 10 matches each pixel to the correct class by choosing the type of pixelwise descriptors, the order in which those descriptors are applied in the decision trees, the location of the pixels that are being compared and the comparison threshold used to make each decision. The type of pixelwise descriptor is characterized by the type of operation performed on the pixel values of the offset neighboring pixels. For example, the operation may calculate the mean of the pixel values, the standard deviation of the pixel values or the difference of the means or deviations for pixels in separate offset boxes.

Figure 13:
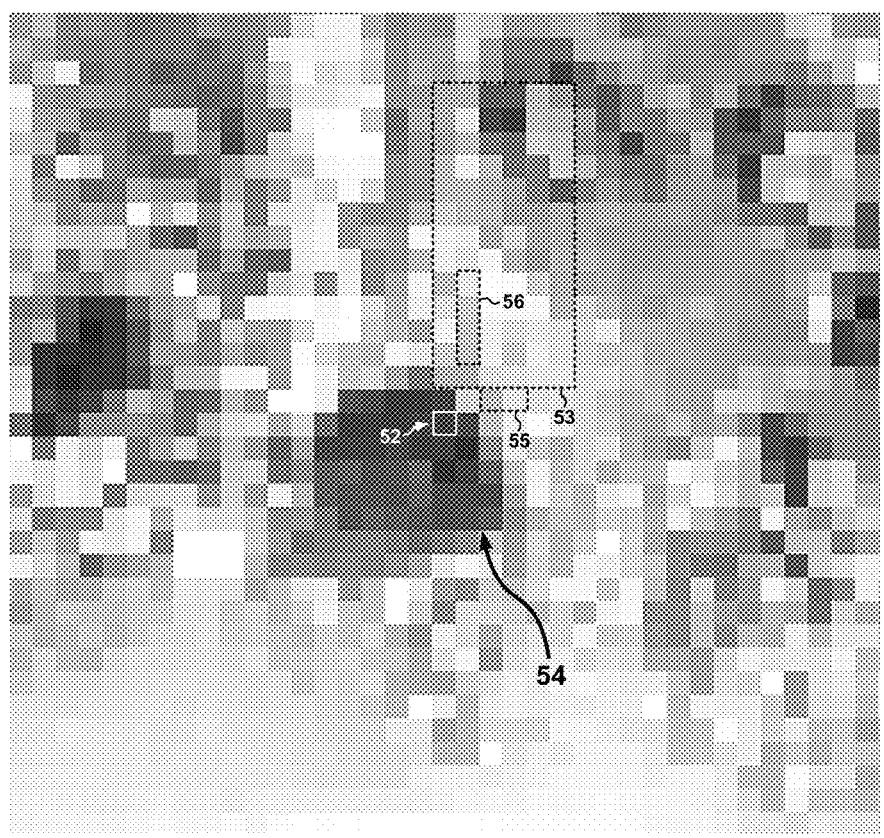
FIG. 13 shows a matrix of pixels including a characterized pixel and a larger box of pixels whose lower left corner is offset from the characterized pixel by two pixels in the y dimension.

In a hypothetical training of the pixelwise descriptors 45-51 on the pixels of learning tiles 40 and 44, each pixel is first analyzed by pixelwise descriptor 45. Descriptor 45 determines the average red value of the pixels in a 6×13 box of pixels that is offset from the characterized pixel by two pixels in the y dimension (0,2). FIG. 13 illustrates the characterized pixel 52 and the box 53 of pixels whose lower left corner is offset from characterized pixel 52 by zero pixels in the x dimension and two pixels in the y dimension. Pixel 52 belongs to a nucleus 54 containing the Ki-67 protein that has been stained with DAB dye connected to the Ki-67 antibody that attaches to the Ki-67 protein. In this hypothetical implementation, the average red value of the pixels in box 53 is less than the threshold value of 142.9 used by the pixelwise descriptor 45. Therefore, the analysis proceeds along the branch of the decision tree to pixelwise descriptor 46.

Descriptor 46 determines the average blue value of the pixels in a 2×1 box 55 of pixels that is offset from characterized pixel 52 by two pixels in the x dimension and one pixel in the y dimension. FIG. 13 shows the box 55 that is used for the determination of the blue value of the pixels. In this example, the average blue value of the pixels in box 55 is less than the threshold value of 119.1 used by the pixelwise descriptor 46, so the analysis proceeds along the branch of the decision tree to pixelwise descriptor 48. Descriptor 48 determines the average green value of the pixels in a 1×4 box 56 of pixels that is offset from characterized pixel 52 by one pixel in the x dimension and four pixels in the y dimension. In this case, the average green value of the pixels in box 56 is greater than the threshold value of 39.1 used by the pixelwise descriptor 48, so the decision tree of pixelwise descriptors indicates that characterized pixel 52 most probably belongs to the unblurred class of pixels. Thus, the decision tree has been trained to correctly classify each pixel as belonging either to the unblurred class (ub) of pixels in the learning region 40 or to the blurred class (bl) of pixels in the blurred, copied learning region 44.

The decision tree of pixelwise descriptors outputs the posterior probabilities that each pixel belongs to one of the selected classes, in this example blurred pixels (bl), unblurred pixels (ub) and background pixels (bg). In other implementations, the class probabilities are divided between only blurred pixels (bl) and unblurred pixels (ub). The output probabilities are normalized so that the sum of the probabilities of belonging to a class within the selected classes is 100%. The decision tree indicates that the probability P(ub) that characterized pixel 52 belongs to the unblurred pixel class is 60%. The decision tree predicts that characterized pixel 52 has a 38% probability P(bl) of belonging to the blurred pixel class and a 2% probability P(bg) of belonging to the class of background pixels.

In this embodiment, nineteen other decision trees of pixelwise descriptors are also trained to predict that other random training pixels in the learning tiles 40, 44 have the greatest probability of belonging to the selected pixel classes. Each random forest decision tree of pixelwise descriptors is trained so that, for all of the training pixels of the learning tiles, the same order of descriptors with the same offsets, boxes, thresholds and other coefficients output a highest probability class that matches the tile in which each training pixel is located. The parameters of each decision tree are modified during the training mode until each randomly selected training pixel is correctly classified as belonging either to the learning region 40 or to the blurred, copied learning region 44. The best match is achieved when the highest probability class for all of the selected training pixels is correct, and those indicated probabilities are closest to 100%. The parameters that are modified to achieve the best match are (i) the comparison threshold at each pixelwise descriptor, (ii) the offset of the pixels being compared, (iii) the size and shape of the box of pixels being compared, (iv) the quality of the pixels that is being compared (e.g., mean color value), and (v) the order in which the pixelwise descriptors are placed in each decision tree.

The pixelwise descriptors can be more complex than merely comparing an average color value to a threshold. For example, pixelwise descriptor 50 calculates the difference of the average (mean) color values in two offset boxes and then compares the difference to a threshold. Yet other pixelwise descriptors compare a threshold to other pixel values, such as (i) the color value of a second pixel at a predetermined offset, (ii) the difference between the color value of the characterized pixel and the color value of a second pixel at a predetermined offset, (iii) the standard deviation among the color values of pixels in a box of predetermined size at a predetermined offset from the characterized pixel, (iv) the difference between the standard deviations of the pixels in two boxes, (v) the sum of the gradient magnitude of the color values of pixels in a box of predetermined size at a predetermined offset from the characterized pixel and at a predetermined orientation, and (vi) the orientation of the gradient edge of the color values of pixels in a box of predetermined size at a predetermined offset from the characterized pixel.

In step 32, system 10 classifies each pixel of digital image 36 as most likely resembling either the learning region or the copied learning region using the pixel classifier trained in step 31. The image analysis program applies the pixel-oriented image analysis of the decision trees of pixelwise descriptors to each of the pixels of the original digital image 36 of stained tissue, including the pixels of learning tile 40 (tile #14). In one implementation, system 10 classifies each pixel as belonging to the blurred pixel class corresponding to the blurred, copied learning region 44 if each decision tree of pixelwise descriptors indicates a probability P(bl) greater than 55% of belonging to the blurred pixel class. Thus, the pixel classifier applies a probability threshold of 0.55 to classify pixels as being blurred.

Areas of digital image 36 that contain pixels in the blurred pixel class may be blurred for various reasons. For example, in order to acquire a high resolution digital image of a tissue slice, the tissue is typically scanned in multiple strips or stripes in order to cover all of the tissue. If the focal length is not optimally adjusted on a scanning pass, then an entire scanning stripe may be out of focus and blurred. Local areas may also be blurred if the areas of tissue are lifted from the glass slide so that the focal length is shorter than for the remainder of the tissue. Microdroplets are another possible cause of blurred areas on a digital image of stained tissue. If the stained tissue is scanned while small areas of moisture are present on the tissue surface, the light used to acquire the digital image may be refracted differently by the moisture and may create small blurred areas. There are also other causes of blurring other than scanning stripes, raised areas and microdroplets.

Figure 14:
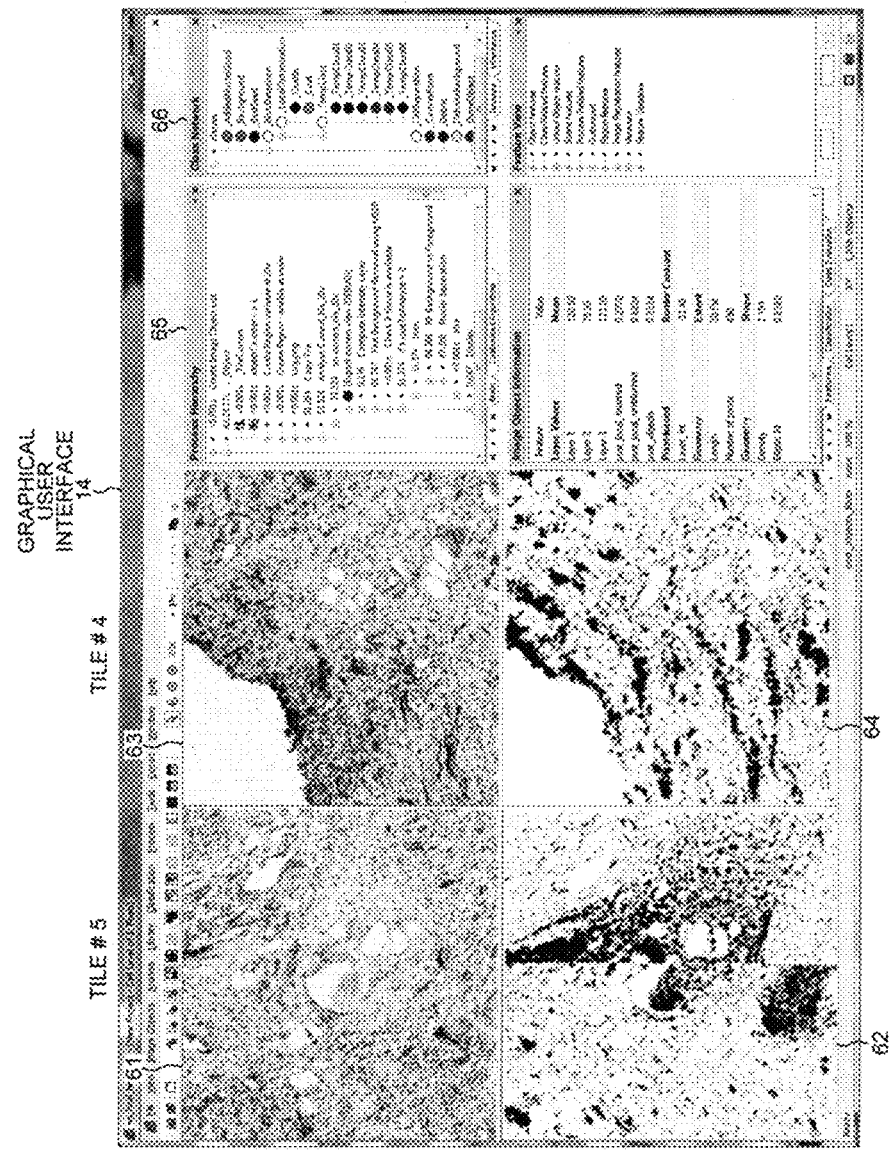
FIG. 14 is a screenshot of the graphical user interface of the system of FIG. 1 showing two tiles of the image of stained tissue and the associated heat maps in which pixels are assigned the colors associated with the pixel class to which each pixel most probably belongs.

In one embodiment, each pixel that has greater than a 55% probability of belonging to the blurred class of pixels is assigned the color white (255, 255, 255), and all other pixels are assigned the color black (0, 0, 0). FIG. 14 is a screenshot of graphical user interface 14 displaying the tile #5 of digital image 36 in an upper left frame 61. Using the classifying performed in step 32, system 10 displays a heat map 62 of tile #5 in the lower left frame that was generated by applying pixelwise descriptors to the original image of stained tissue. The pixels of heat map 62 are assigned the color black for the blurred class of pixels and the color white for the nonblurred class of pixels and the background class of pixels. By outputting posterior probabilities of belonging to only the selected three pixel classes, extraneous information is removed from heat map 62, and a clearer presentation is provided to the pathologist to indicate the blurred regions that should not be used in grading and scoring the tissue sample. Tile #4 is also displayed on graphical user interface 14 in a frame 63 to the right of frame 61. A heat map 64 of tile #4 is displayed below frame 63 and to the right of heat map 62. For heat map 64, using the classifying performed in step 32, the pixels of the blurred pixel class are also assigned the color black, and the pixels of the unblurred pixel class and the background class are assigned the color white.

In step 33, digital image 36 is segmented into image objects corresponding to blurred areas and unblurred areas based on the classifying of each pixel in step 32 as belonging either to the learning region 40 or to the blurred, copied learning region 44. System 10 segments digital image 36 into blurred areas and unblurred areas based on each pixel being classified as belonging to the unblurred class of pixels or the blurred class of pixels. System 10 performs the object-based segmentation using a process hierarchy 65 of process steps and a classification network 66 of class membership functions. For example, the membership function of the class of blurred objects ignores individual pixels of the blurred pixel class that do not belong to the pixel class of the surrounding pixels. Only larger clumps of blurred pixels are segmented into image objects belonging to the blurred object class. Thus, the membership function of the class of blurred objects has a minimum area.

FIG. 14 shows the parameters of the process hierarchy 65 and the classification network 66 being displayed on the graphical user interface 14 to the right of the frame 63. The process hierarchy 65 lists the steps of the object-oriented analysis used in the segmentation. The class network 66 lists the membership functions as well as the colors assigned to the classes of objects.

Figure 15:
FIG. 15 is a detailed view of tile #4 of the digital image of stained breast tissue of FIG. 4.
Figure 16:
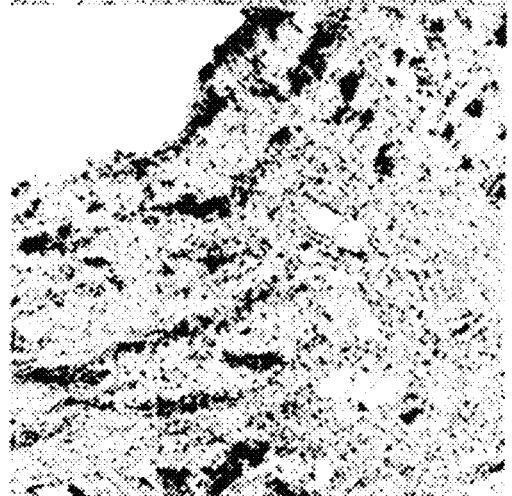
FIG. 16 is a heat map in which each pixel of tile #4 of FIG. 15 has the color associated with either the blurred pixel class or the unblurred pixel class.
Figure 17:
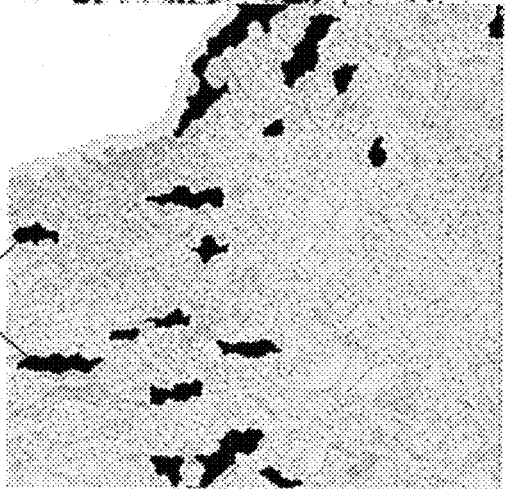
FIG. 17 is a segmented version of tile #4 of FIG. 15 identifying the blurred areas as black image objects.

In step 34, the blurred areas and the unblurred areas of digital image 36 are identified on the graphical user interface 14. FIGS. 15-17 illustrate how the blurred areas are identified. FIG. 15 shows an image 67 of original tile #4 from FIG. 6. FIG. 16 shows the heat map 64 that was generated from image 67 in which blurred pixels are black, and unblurred pixels are white. FIG. 17 is a segmented version 68 of image 67 (tile #4) in which blurred areas are identified as black image objects 69. Only those black pixels of heat map 64 that are contiguous with a critical mass of other black pixels are segmented into the image objects 69 that represent blurred area. The minimum area of blurred image objects can be defined by the image analysis program, and the entire area is defined as the image object, including pixels within the area that belong to the unblurred pixel class. By assigning classes to pixels before segmenting those pixels into objects, the entire high-resolution digital image 36 can be classified into blurred areas and unblurred areas in a computationally efficient manner, and the accuracy of the object-oriented segmentation can be improved.

Method 24 involving both artificially blurring and training a pixel classifier for each digital image more accurately identifies blurred regions than applying the same blur detection algorithm and associated thresholds and parameters to all of the images of tissue slices. For example, a "Difference of Gaussians" algorithm could be used for blur detection on all images by blurring each image using the same two parameters for blurring radii, and then subtracting the pixel values obtained using the two blurring radii from one another to obtain blur information. Such a blur detection algorithm would not as consistently identify blurred areas on images of different kinds of tissue as does method 24, which trains a pixel classifier for each image of a tissue slice.

In step 35, system 10 segments image objects in only the areas of digital image 36 that have not been identified as being blurred. System 10 performs object-oriented image analysis on the unblurred areas of digital image 36 in order to obtain a prognostic cancer score for the stained tissue. In one application of method 24, the results of automated scoring of the Ki-67 test are improved by preventing the count of Ki-67 positive and negative nuclei from being performed on blurred areas of the image of stained tissue. The Ki-67 test counts the number of cancer cells whose nuclei have been stained using the Ki-67 marker compared to the overall number of cancer cells. However, the accuracy with which automated image analysis can recognize and count the stained cancer cells and the total number of cancer cells is drastically reduced when the image analysis is performed on blurred areas with low color contrast, and the Ki-67 score becomes less reliable when blurred regions are included in the scoring region. Consequently, the accuracy of the Ki-67 score is improved when blurred regions are excluded from the scoring region.

In other embodiments, method 24 is used to identify blurred areas of digital images of tissue stained using other biomarkers in order to improve the accuracy of other cancer grading systems that rely on the other biomarkers. For example, method 24 can be used to detect blurred areas in breast tissue stained using the estrogen receptor (ER) antibody. A more accurate Allred score indicating the severity of breast cancer is then obtained by determining the percentage of cells stained using ER only in the unblurred areas of the image. Similarly, a more accurate HercepTest score can be obtained by determining the degree of membrane staining of the Human Epidermal growth factor Receptor 2 (Her2) protein only in unblurred areas of the image. In addition, method 24 can be used to improve the cancer grading performed on images of tissue stained using biomarkers such as progesterone receptor (PR), Her2/neu cytoplasmic staining, cytokeratin 18 (CK18), transcription factor p63, Mib, SishChr17, SishHer2, cluster of differentiation 44 (CD44) antibody staining, CD23 antibody staining, and hematoxylin and eosin (H&E).

Using method 24 to exclude blurred areas from being considered in various cancer scoring and grading systems is a considerable improvement over the conventional method in which a pathologist manually marks areas of the images of stained tissue that appear to be blurred. First, identifying blurred areas by visually inspecting tissue slides is tedious and time-consuming. Thus, even an experienced pathologist may misjudge or overlook areas that are blurred due to fatigue and loss of concentration. Second, visual inspection can identify only relatively large blurred areas. Each tissue slide can have millions of pixels, and hundreds of small blurred areas on the slide can be caused by microdroplets that refract the light used to create the digital image. Visual inspection cannot identify blurred areas that includes only a few hundred pixels, such as the objects 69 representing small blurred areas shown in FIG. 17. And even if visual inspection could identify that hundreds of small blurred areas in digital image 36, it would not be feasible manually to mark each of the regions so that the blurred areas can be excluded from the cancer scoring.

In yet another embodiment, method 24 is used to rate the image quality of each digital image of stained tissue. For example, cancer scoring may be based on the image analysis of multiple slides of stained tissue, and low quality slide images may be excluded from the scoring. After step 34, system 10 displays an indicator on graphical user interface 14 indicating the overall quality of each digital image of stained tissue. The indicator may specify the image quality as a percentage of blurred area, a list of the numbers of tiles that are mostly blurred or simply as a warning, such as a red exclamation mark or traffic hazard sign. For example, a stop sign could be a warning indicator that the digital image exhibits insufficient quality for scoring. System 10 may also list metrics of image quality, such as the relative area of unblurred regions to the total tissue area, the absolute area of unblurred regions in square microns or square millimeters, or the number of tumor cells within the unblurred regions. If one of these measurements is lower than a predetermined threshold, then the image is not eligible for scoring, and the warning indicator is displayed to the user. Method 24 may also be used to automatically rate the image quality of large batches of images of stained tissue. For example, detailed manual inspection of excessive blur on thousands of tissue slides would not be economically feasible. Yet a pre-scoring exclusion of excessively blurred images could be performed with little additional effort because the quality control could use the same steps and results of method 24 that allow cancer scoring to be performed only in unblurred areas.

Figure 18:
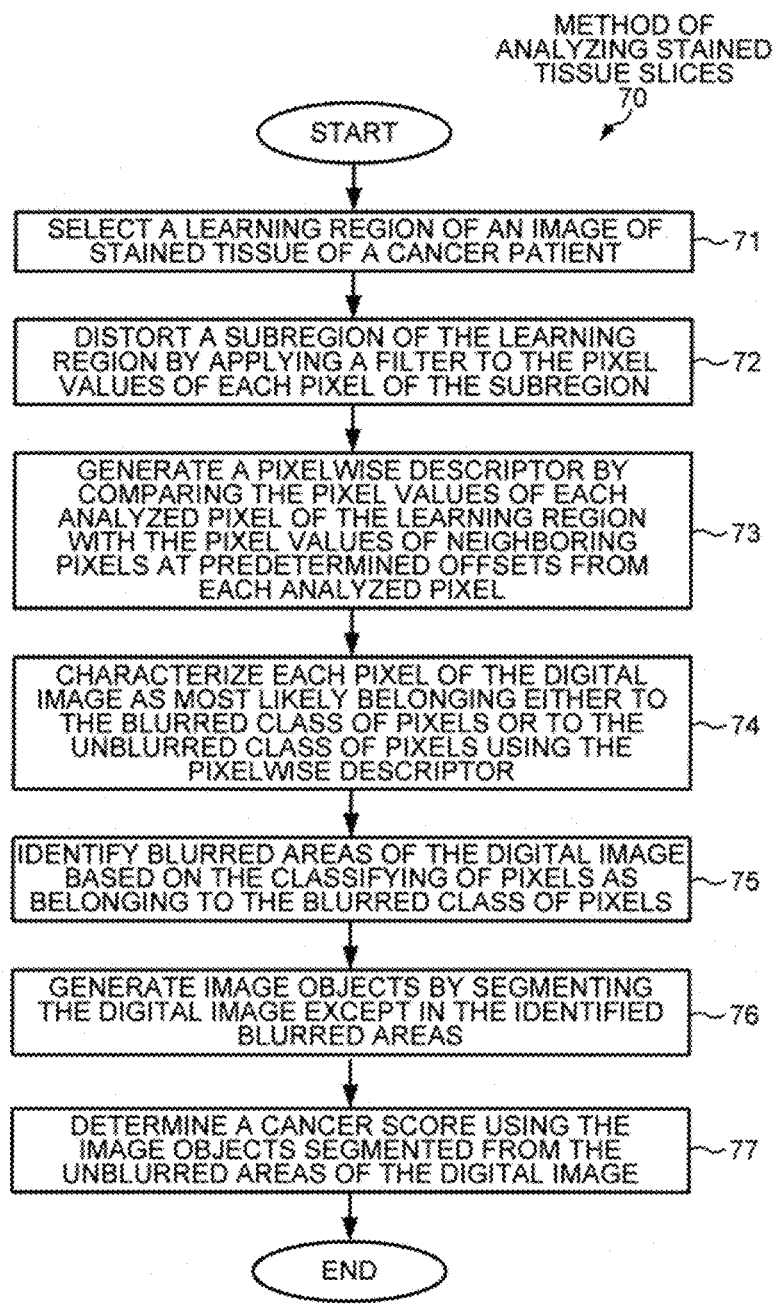
FIG. 18 is a flowchart of steps of another embodiment of a method for identifying blurred areas in digital images of stained tissue.

FIG. 18 is a flowchart of steps 71-77 of another method 70 in which pixelwise descriptors are trained to indicate the probability that individual pixels in a learning region of a digital image belong to a blurred class of pixels or to an unblurred class of pixels. Unlike method 24, the pixelwise descriptors are not training on a blurred copy of a learning tile. Instead, the pixelwise descriptors of method 70 are trained on a blurred subregion of a learning region as well as on an unblurred subregion of the learning region.

In step 71, a learning region is selected on a digital image of a slice of tissue from a cancer patient that has been stained using a biomarker. For example, breast tissue of the patient is stained with a dye attached to the estrogen receptor (ER) antibody that marks the corresponding protein. Each pixel of the digital image has a color defined by pixel values, and a portion of the pixels exhibits the color of the dye stained using the biomarker.

In step 72, a subregion of the learning region is distorted by applying a filter to the pixel values of each pixel of the subregion so as artificially to blur the subregion.

In step 73, one or more pixelwise descriptors are generated by analyzing the pixel values of each pixel of the learning region and by comparing the pixel values of each analyzed pixel with the pixel values of neighboring pixels at predetermined offsets from each analyzed pixel. Each pixelwise descriptor is trained to indicate, based on the comparing with neighboring pixels, that each pixel of the learning region most likely belongs either to a blurred class of pixels such as those in the subregion or to an unblurred class of pixels such as those in the remainder of the learning region.

In step 74, each pixel of the digital image is characterized as most likely belonging either to the blurred class of pixels or to the unblurred class of pixels using the one or more pixelwise descriptors by classifying each characterized pixel based on the pixel values of neighboring pixels at predetermined offsets from each characterized pixel.

In step 75, blurred areas of the digital image are identified based on the classifying of pixels as belonging to the blurred class of pixels.

In step 76, image objects are generated by segmenting the digital image except in the identified blurred areas. For example, the image objects represent cells of the stained breast tissue.

In step 77, system 10 determines a cancer score using the image objects. The score is indicative of a level of cancer malignancy of the slice of tissue from the cancer patient. For example, the score is an Allred score that indicates the severity of breast cancer based on the percentage of cells in the unblurred areas of the digital image that have been stained to a threshold intensity by the estrogen receptor (ER) antibody.

Data analysis server 13 includes a computer-readable storage medium having program instructions thereon for performing method 24 and method 70. Such a computer-readable storage medium includes instructions of the image analysis program for generating decision trees of pixelwise descriptors that indicate the probability that a pixel belongs to a pixel class based on characteristics of neighboring pixels. The computer-readable storage medium also includes instructions for generating image objects of a data network corresponding to patterns in digital images that have been stained by a particular biomarker.

Although the present invention has been described in connection with certain specific embodiments for instructional purposes, the present invention is not limited thereto. Although methods 24 and 70 have been described as ways of identifying blurred pixels using pixel-oriented image analysis and then segmenting image objects using object-oriented image analysis, the novel method can also be used to identify other qualities of pixels in stained tissue that reduce the accuracy of object-oriented image analysis performed subsequently. For example, the novel method can use pixel classifiers to identify folds and stretch distortions in stained tissue so that object-oriented segmentation can be performed only on undistorted or unfolded areas of the tissue. Accordingly, various modifications, adaptations, and combinations of various features of the described embodi-

What is claimed is:

1. A method comprising:
   selecting a learning region of a digital image of a slice of tissue from a cancer patient that has been stained using a biomarker, wherein the digital image comprises pixels, wherein each of the pixels has a color defined by pixel values, wherein a portion of the pixels exhibits the color stained using the biomarker;
   duplicating the learning region to create a copied learning region;
   distorting the copied learning region by applying a filter to the pixel values of each pixel of the copied learning region so as artificially to blur the copied learning region;
   training a pixel classifier by analyzing the pixel values of each pixel of the learning region and the pixel values of a corresponding pixel in the copied learning region, wherein the pixel classifier is trained to correctly classify each pixel as belonging either to the learning region or to the copied learning region;
   classifying each pixel of the digital image as most likely resembling either the learning region or the copied learning region using the pixel classifier;
   segmenting the digital image into blurred areas and unblurred areas based on the classifying of each pixel as belonging either to the learning region or to the copied learning region; and
   identifying the blurred areas and the unblurred areas of the digital image on a graphical user interface, wherein the analyzing the pixel values involves comparing the pixel values of each analyzed pixel with the pixel values of neighboring pixels at predetermined offsets from each analyzed pixel, and wherein based on the comparing the pixel classifier is trained to indicate that each pixel of the learning region and the copied learning region most likely belongs either to a blurred class of pixels such as those in the copied learning region or to an unblurred class of pixels such as those in the learning region.

2. The method of claim 1, wherein the pixel classifier is taken from the group consisting of: a random forest classifier, a convolutional neuronal network, a decision tree classifier, a support vector machine classifier and a Bayes classifier.

3. The method of claim 1, wherein the pixel values of the digital image include red, green and blue pixel values, and wherein the selecting of the learning region uses transformation pixel values obtained using a color transformation of the red, green and blue pixel values of the digital image.

4. The method of claim 1, further comprising:
   segmenting the unblurred areas of the digital image to generate image objects;
   determining a score using the image objects, wherein the score is indicative of a level of cancer malignancy of the slice of tissue from the cancer patient.

5. The method of claim 1, further comprising:
   determining a histopathological score based on tissue stained using the biomarker in the unblurred areas of the digital image.

6. The method of claim 1, wherein the biomarker is used to immunohistochemically stain for the Ki-67 protein.

7. The method of claim 1, further comprising:
   dividing the digital image into tiles, wherein the learning region is one of the tiles, and wherein for each pixel the color stained using the biomarker has a magnitude derived from the pixel values of the pixel; and
   identifying the learning region as the tile whose pixel values represent a mean magnitude of the color stained using the biomarker.

8. The method of claim 1, wherein the pixel classifier is a binary classifier that is trained using supervised learning.

9. A method comprising: selecting a learning region of a digital image of tissue that has been stained using a biomarker; duplicating the learning region to create a copied learning region; blurring the copied learning region by applying a filter to each pixel of the copied learning region; generating a pixelwise descriptor by comparing learning pixels of the learning region and the copied learning region to a neighboring pixels at predetermined offsets from each of the learning pixels, wherein based on the comparing the pixelwise descriptor is trained to indicate that each of the learning pixels most likely belongs either to an unblurred class of pixels such as those in the learning region or to a blurred class of pixels such as those in the copied learning region; classifying each pixel of the digital image as belonging either to the unblurred class of pixels or to the blurred class of pixels using the pixelwise descriptor; segmenting the digital image into blurred areas and unblurred areas based on the classifying; and identifying the blurred areas and the unblurred areas of the digital image on a graphical user interface, wherein the biomarker is used to stain the tissue with a staining color, wherein a portion of the pixels of the digital image exhibits the staining color, further comprising:
   determining a score based on image objects identified in the unblurred areas of the digital image using the pixels that exhibit the staining color, wherein the score is indicative of a level of cancer malignancy of the tissue.

10. The method of claim 9, further comprising:
    determining a histopathological score based on the tissue stained using the biomarker in the unblurred areas of the digital image.

11. The method of claim 9, further comprising:
    segmenting the unblurred areas of the digital image into image objects; and
    determining a score using the image objects, wherein the score is indicative of a level of cancer malignancy of the tissue.

12. The method of claim 9, wherein each pixel of the digital image has a pixel value, and wherein the filter applied to each pixel of the copied learning region is a Gaussian filter that modifies the value of each pixel based on the values of neighboring pixels.

13. The method of claim 12, wherein the Gaussian filter is applied at a radius of ten microns.

14. The method of claim 9, wherein the pixelwise descriptor is a binary classifier that is trained using supervised learning.

15. The method of claim 9, wherein each pixel of the digital image has a color defined by pixel values, and wherein the pixelwise descriptor compares the pixel values of each classified pixel of the digital image with the pixel values of neighboring pixels at the predetermined offsets from each classified pixel.

* * * * *